United States Patent [19]

Ege et al.

[11] Patent Number: 5,674,412
[45] Date of Patent: Oct. 7, 1997

[54] BUTT SPLICER FOR COPPER BASED TAPES

[76] Inventors: Sigmund Ege; Ragny Ege, both of Theodore Lovstads Vei 50, 0286 Oslo, Norway

[21] Appl. No.: 411,968

[22] Filed: Mar. 28, 1995

[51] Int. Cl.$^6$ .................. B23K 1/14; B23K 3/00
[52] U.S. Cl. .............. 219/85.15; 219/57; 219/85.14; 219/85.22; 228/5.7; 228/212; 228/250
[58] Field of Search .............. 219/56, 57, 85.1, 219/85.14, 85.15, 85.16, 85.21, 85.22; 228/5.7, 212, 213, 244, 245, 246, 247, 250

[56] References Cited

U.S. PATENT DOCUMENTS

| | | |
|---|---|---|
| 2,206,375 | 7/1940 | Swift . |
| 3,649,800 | 3/1972 | Happel et al. ............ 219/64 |
| 3,851,138 | 11/1974 | Metcalf et al. ............ 219/83 |
| 4,110,592 | 8/1978 | Ege ........................ 219/85.22 |
| 4,139,145 | 2/1979 | Moore ..................... 228/212 |
| 4,286,744 | 9/1981 | Gullotti et al. ........... 228/125 |
| 4,563,563 | 1/1986 | Ege ........................ 219/85.19 |
| 4,765,532 | 8/1988 | Uomoti et al. ............ 228/5.7 |
| 5,062,566 | 11/1991 | Ege ........................ 228/102 |
| 5,098,009 | 3/1992 | Tsuchida et al. .......... 228/189 |
| 5,125,559 | 6/1992 | Ege ........................ 228/213 |
| 5,167,362 | 12/1992 | Ege ........................ 228/213 |
| 5,242,104 | 9/1993 | Ege ........................ 228/244 |

FOREIGN PATENT DOCUMENTS 1738552  6/1992  U.S.S.R. .................. 219/119

*Primary Examiner*—Teresa J. Walberg
*Assistant Examiner*—J. Pelham
*Attorney, Agent, or Firm*—Quarles & Brady

[57] ABSTRACT

Apparatus and method for butt-splicing hard-rolled and\or wide copper and copper alloy tapes employs a rolling electrode and varies the contact angle of the tape ends during soldering.

9 Claims, 6 Drawing Sheets

BUTT SPLICER FOR COPPER BASED TAPES

BACKGROUND OF THE INVENTION

It has been known to end-splice copper or copper-alloy tapes by means of apparatus that inserts appropiate lengths of silver-solder between the cut ends of said tapes while they are positioned over the flat surface of an electrode, lowering another electrode over the area to be spliced and then passing a sufficient current through the two electrodes. Such apparatus performs satisfactorily for small widths of soft copper as described in below named patents but if the copper or alloy is hard rolled or is very wide, consistently satisfactory splices may not be obtained due to buckling of the tape edges or, if the tapes are of fine gage, areas where they overlap at the seam. Such buckling or overlapping is, of course, intolerable, if the tape is being fed into a punch press or the like. The presently described method and apparatus allows reliable splices to be made in hard-rolled copper and alloy tapes without buckling or overlap and with splices that are stronger than the tape metal, itself.

In U.S. Pat. Nos. 4,563,563, and 5,125,559, issued to one of the applicants of the present invention, disclosures are made that are now part of the industrial art and may be described as part of the procedures herein practiced, but novel improvements, herein disclosed for the first time, make it practical to apply these butt splicing procedures to hard or especially wide tapes.

DETAILED DESCRIPTION OF A PREFERRED EMBODIMENT

Figure 1:
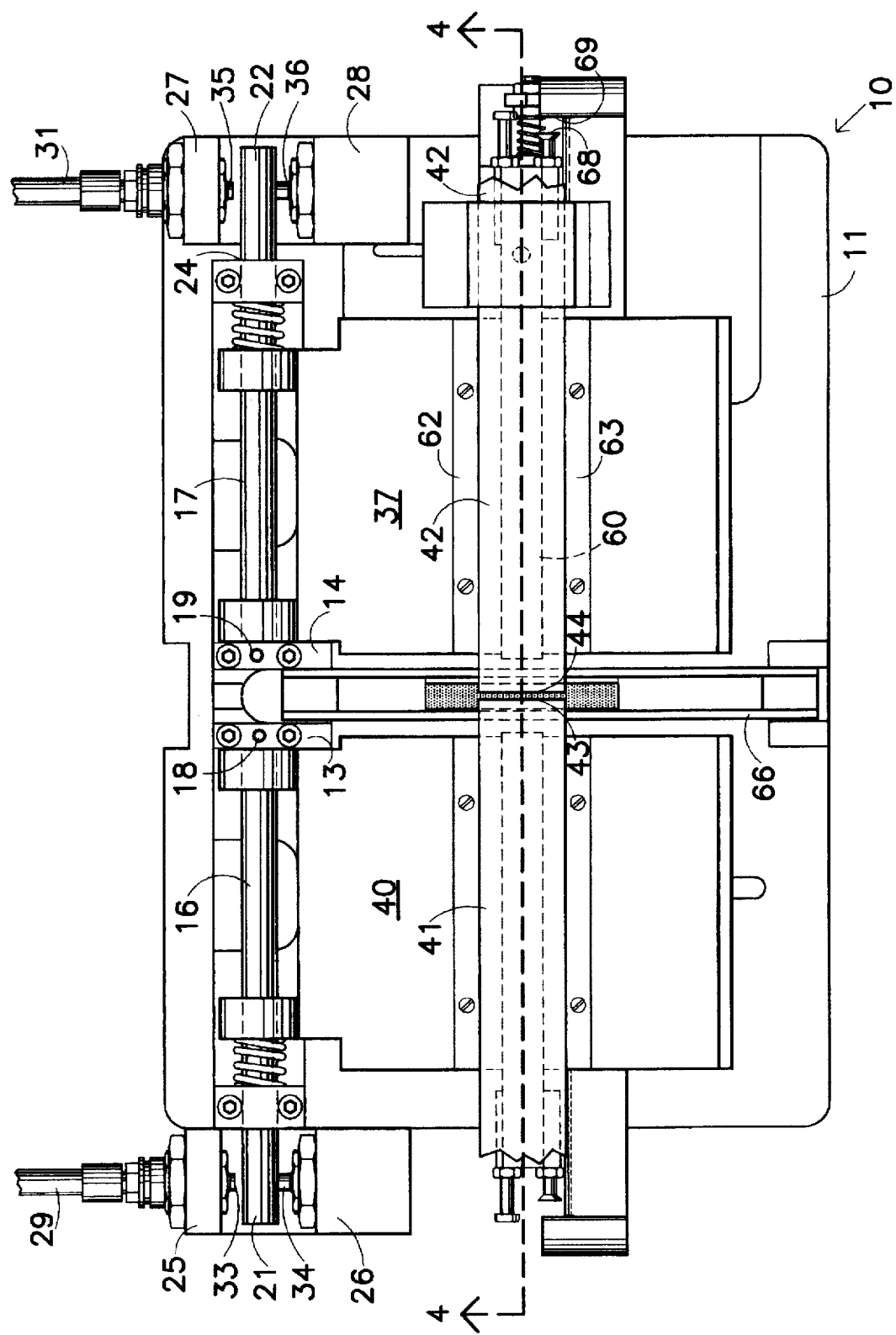
FIG. 1 shows a plan view of the apparatus of our invention, omitting the upper jaws.
Figure 2:
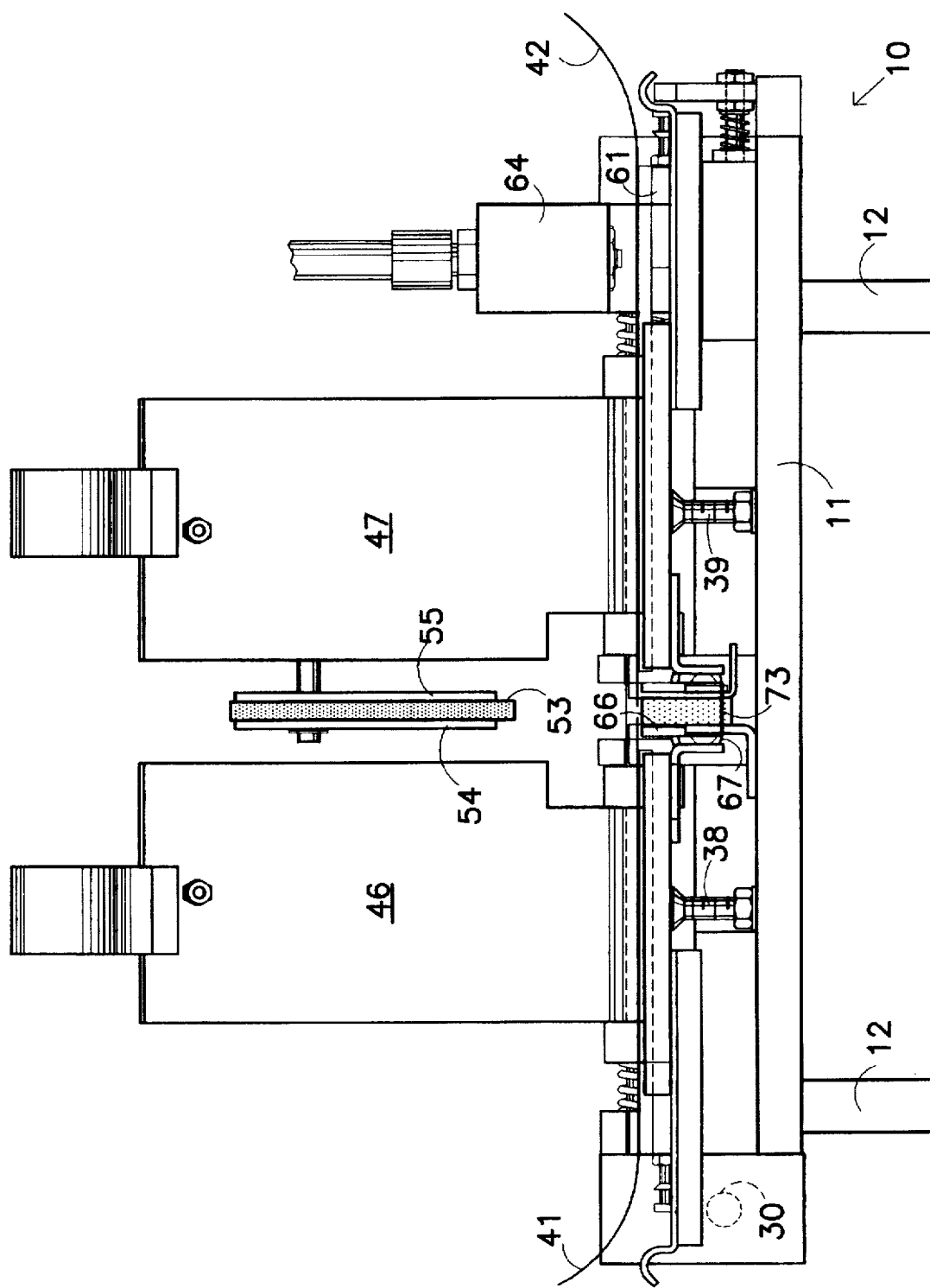
FIG. 2 shows a front elevation of the apparatus of FIG. 1, with the upper jaws raised.
Figure 3:
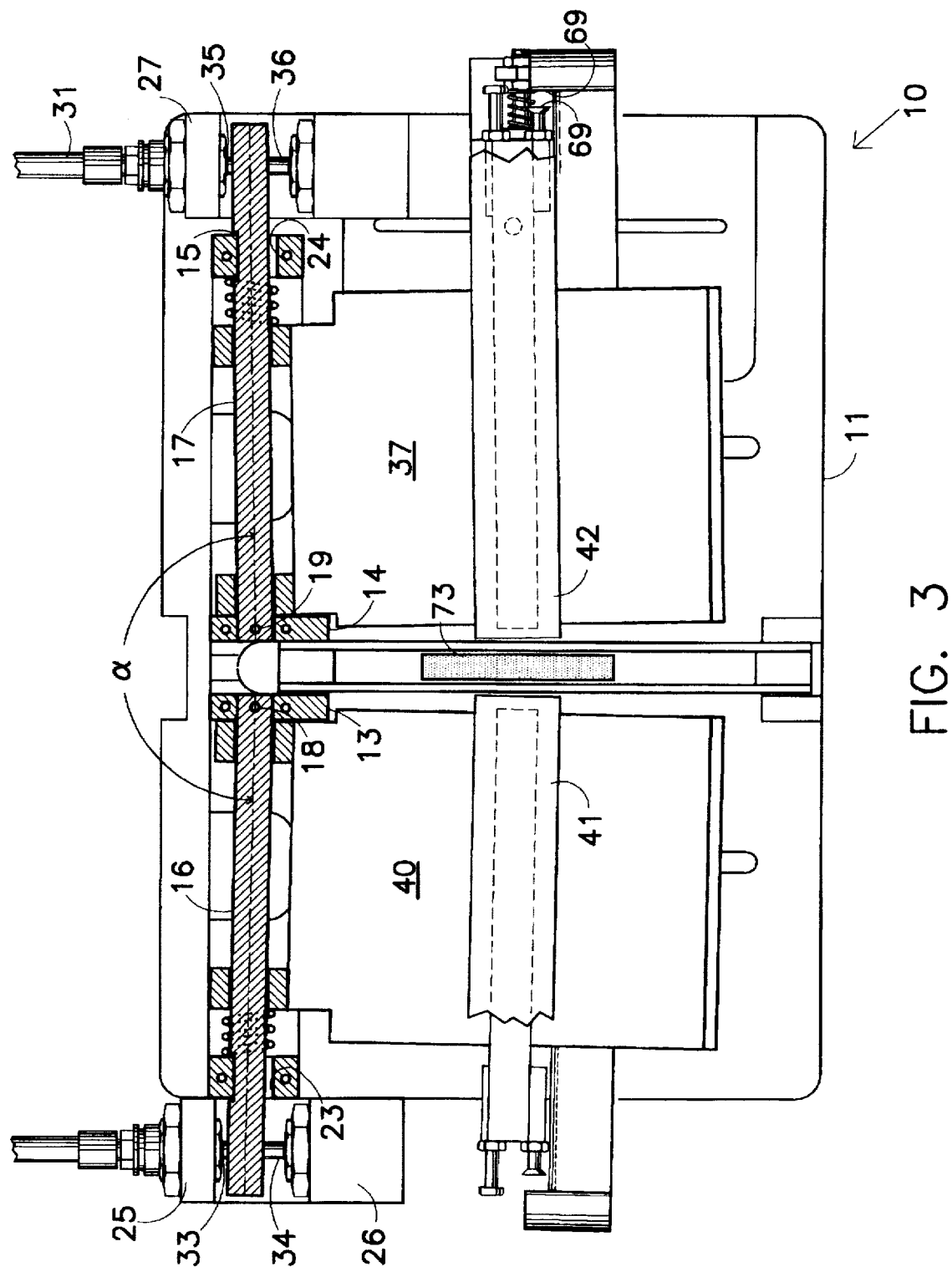
FIG. 3 shows a section through lines 3—3 of FIG. 5.

Referring first to FIGS. 1 and 2 our apparatus 10 comprises a sturdy planar platform 11, supported by 4 columns 12—12, and, in turn, supporting hinge rod brackets 13, 14 that hold horizontal hinge rods 16, 17 so that they can pivot somewhat, horizontally, around respective pins 18, 19 (see, also, FIG. 3). As shall be explained, these hinge rods 16, 17 mount supporting surfaces for the tape ends that shall be spliced.

Figure 4:
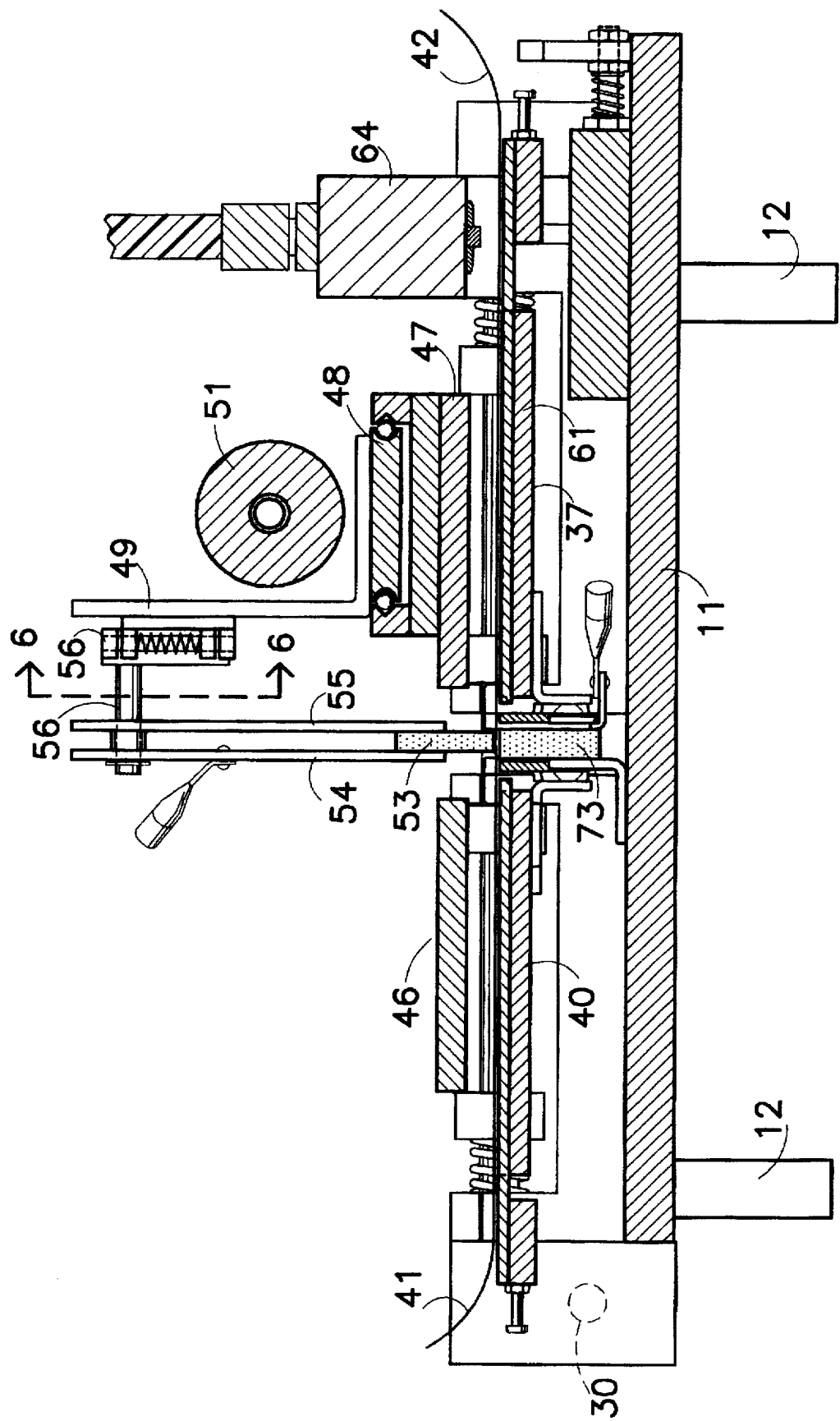
FIG. 4 shows a vertical section through lines 4—4 of FIG. 1.
Figures 5, 6:
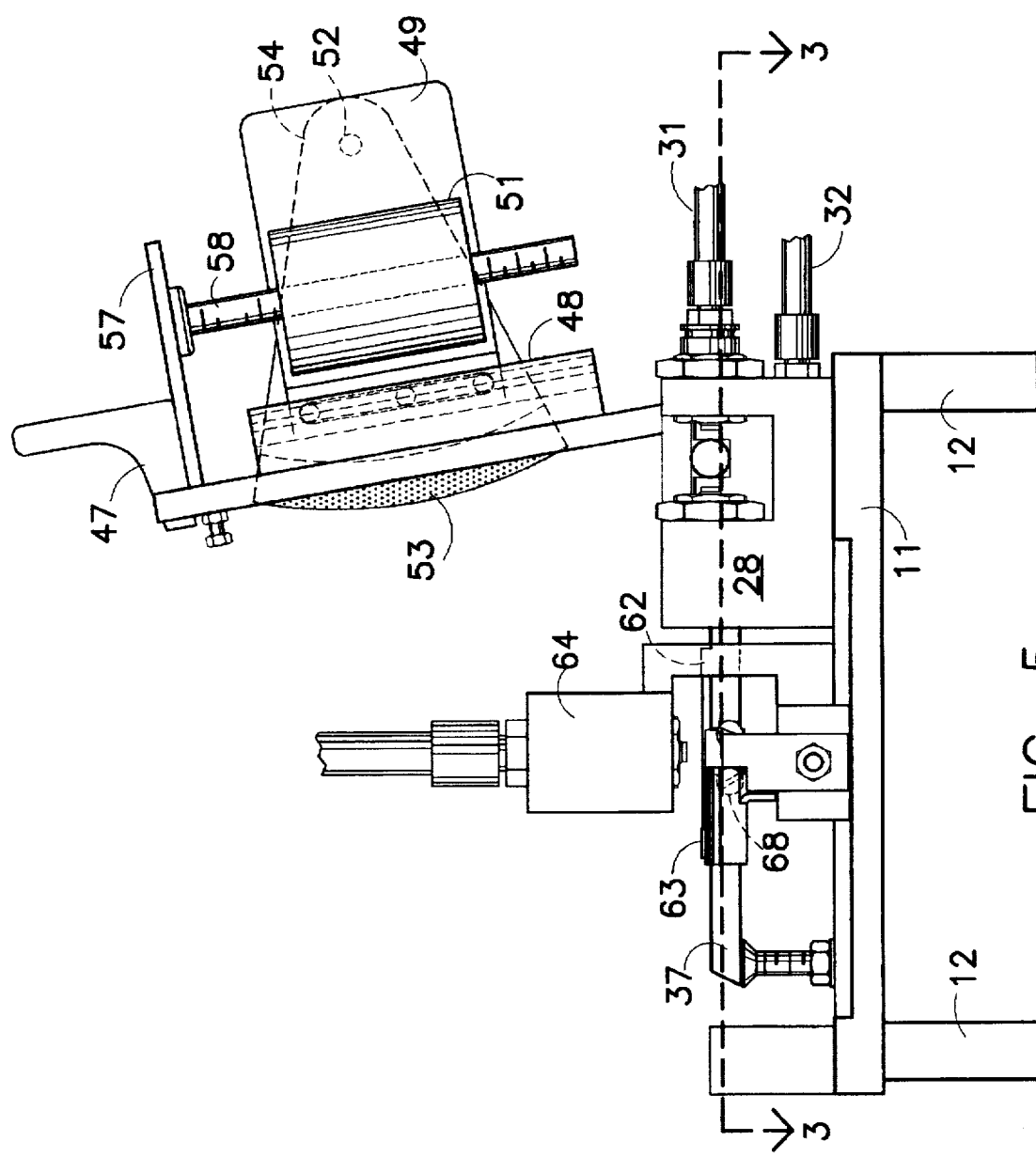
FIG. 5 shows a side elevation of our invention with the elements spread out in rotation.
FIG. 6 shows a section through lines 6—6 of FIG. 4.
Figure 7:
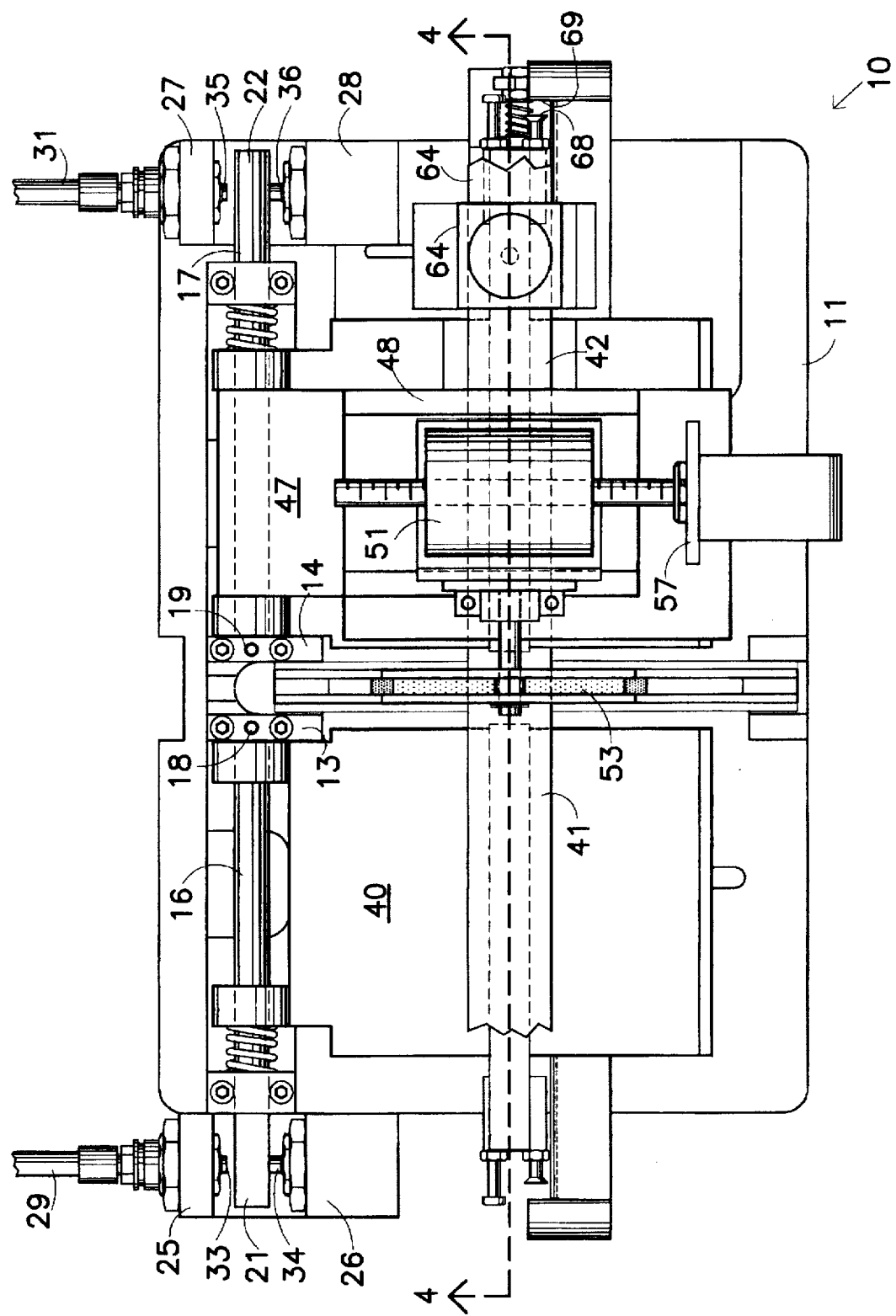
FIG. 7 shows the plan view of our apparatus of FIG. 1 with the right upper jaw lowered.

Opposite ends 21, 22 of the hinge rods 16, 17 protrude from respective mounts 23, 24, (FIG. 3) and within these mounts a flat area 15 has been milled into each of said hinge rods to allow horizontal movement of the rods within the mounts. Four air cylinders 25, 26, 27, 28, powered from a plant compressed-air supply from hoses 29, 30, 31, and 32 (see, also), FIGS. 4 and 5) comprise respective short pistons 33, 34, 35, 36. These pistons push against the projecting hinge rods 16, 17 and can swing them around the axes 18, 19 for a very small angle. At the beginning of a splicing operation the pistons 33 and 35 of the air cylinders 25 and 27 will have been extended to align the shafts 16, 17 on the same central axis but, after the pistons 34, 36 of the cylinders 26, 28 have been extended the shafts 16, 17 will be aligned at a slight angle to each other.

The hinge rods 16, 17 mount respective supporting surfaces, generally called "lower jaws" 40, 37 which rotate down to rest on supporting posts 38, 39 (FIG. 2) and hold respective tape ends 41, 42 (see FIG. 1) to be spliced. With the hinge rods 16, 17 in line by application of air pressure to the cylinders 25 and 27, the lower jaws 40, 37 will be aligned so that edges 43, 44, if they have been cut square, will be parallel. When, however, air pressure is cut off from the air cylinders 25 and 27 and applied to the cylinders 26 and 28, forming an angle "alpha" between the axes of the hinge rods 16 and 17 an angle "180 deg.-alpha" (see FIG. 4) will form between the edges 43, 44 of the tape ends.

In addition to lower jaws 40, 37 the hinge rods 16, 17 rotatably support respective upper jaws 46, 47 (FIG. 2) of which the jaw 47 supports a linear ball-bearing table 48 which, in turn, supports a bracket 49 (FIG. 4) for a linear step motor 51 and a stub shaft 52 FIG. 2) for a segmental electrode 53 mounted between two sector shaped plates 54, 55. This stub shaft 52 constitutes the center of the circle of which the electrode 53 is a segment, so that, as the stub shaft 52 is advanced the surface of the segment 53 makes rolling contact with the edges being soldered together. To ensure adequate contact of the electrode 53 with the tapes being spliced, the stub shaft 52 is spring mounted by means of a bracket 56 (see FIGS. 4 and 6). The upper jaw 47 mounts an upright 57 to which is cantilevered a horizontal screw 58. The step motor 51 includes an internal rotor that is threaded to the screw 58 and advances the motor along with the table 48, in a predetermined number of steps and a predetermined length of electrical discharge at each step.

A fixed electrode 73 is bracketed to but insulated from the plate 11 to serve as the lower electrode of the soldering operation.

OPERATION

In the operation of our apparatus both upper jaws 46, 47 and the left lower jaw 40 are manually raised. A sliding bar 61, in a groove 60 between two guide rails 62, 63 in the lower right jaw 37 is moved toward the left until it reaches a stop. A tape 42, one of the two tapes to be spliced, is then placed over the sliding bar 61 and between the guide rails 62, 63 (FIGS. 1 and 4) so as to extend over a cutting blade 66 bracketed to the base plate 11. The upper right jaw 47 is then manually lowered, automatically activating an air cylinder 64, by switching, not shown, to clamp the tape 42 to the sliding bar 61. The lower left jaw 40 is then manually lowered to cut the tape 42 by means of a blade 67 to form the edge 44. Both right-hand jaws 37 and 47 are then raised together and the sliding bar 61 pulled to the right until a screw head 68 reaches a stop 69.

A similar procedure is then applied to the left-hand tape 41 to trim the edge and locate it for the proper soldering position with both lower jaws and the left upper jaw down and the upper right jaw raised. A switch is then manually applied to supply power to our apparatus 10 and feed a predetermined length of silver solder (as illustrated in FIG. 2 of U.S. Pat. No. 5,125,559).

At this point the right-hand upper jaw is manually lowered, automatically triggering the following operations. Apparatus mounted on the plate 11 pushes the bar 61 to the left to close the gap between the tape ends 43 and 44, pistons 33 and 35 are retracted and pistons 34 and 36 are extended to make the hinge rods 16 and 17 form a slight angle with each other, maintaining some pressure on the hinge rods 16 and 17 during the splicing operation. Current flows between the upper electrode 53, the tape ends 43, 44 and the lower electrode 73, and the stepmotor 51 starts advancing the table 48. After a short time, typically less than 0.2 seconds, the current pulse is automatically interrupted, while the stepmotor 51 continues to advance the table 48. After advancing the table a short distance, typically 2 mm, the step motor automatically stops. This cycle of a short current pulse and advancing of the step motor repeats until the upper electrode 53 reaches the end of the splice.

Advancing the table 48 and stub shaft 52, which constitutes the center of the circle of which the upper electrode 53 forms a segment has the effect of rolling the segment 53 across the splice that is to be secured, making only line contact of the electrode to the tapes at any point. This can be accomplished by using a much smaller wheel for the electrode within the scope of our invention but we have found that the smaller diameter electrode creates a rougher splice surface.

Both upper jaws are now manually raised and this action automatically releases the spliced tape from the jaw clamps, retracts the cylinder pistons 34 and 36 while operating pistons 33 and 35 to bring the two hinge rods 16 and 17 in line, and brings the table 48 back to its starting position.

The foregoing description has been exemplary rather than definitive of our invention for which we desire an award of Letters Patent as defined in the appended claims.

We claim:

1. A method for butt-splicing the ends of two hard-copper or copper-alloy tapes, each of said tapes comprising two lengthwise edges thereof, comprising the steps of:

(A) fixing a first and second of said tapes onto co-planar flat surfaces and cutting both of said tapes to form trimmed ends thereof, (B) placing said trimmed ends face to face over a flat electrode with a strip of solder between said trimmed ends, (C) fixing said trimmed end of said second of said tapes at a slight angle to said trimmed end of said first of said tapes, (D) lowering an electrode comprising a continuous upwardly curved surface, into line contact of said curved surface with said trimmed ends, close to one of said long edges of said tapes, (E) passing a short duration of current between said electrodes, thereby locally fusing said solder, (F) thereafter rolling said curved surface across said spaced-apart ends and said solder and passing a plurality of short durations of current between said electrodes, thereby effectively joining said ends, and (G) permitting the position of said second of said tapes to rotate slowly so as to reduce said angle during said butt splicing.

2. A method for butt-splicing the ends of two hard-copper or copper-alloy tapes, each of said tapes comprising two lengthwise edges thereof, comprising the steps of:

(A) fixing a first and second of said tapes onto co-planar flat surfaces and cutting both of said tapes to form trimmed ends thereof, (B) placing said trimmed ends face to face over a flat electrode with a strip of solder between said trimmed ends, (C) fixing the ends of said tapes at a slight angle to each other, (D) lowering an electrode comprising a continuous upwardly curved surface, into line contact of said curved surface with said trimmed ends, close to one of said long edges of said tapes, (E) passing a short duration of current between said electrodes, thereby locally fusing said solder, (F) thereafter rolling said curved surface across said spaced-apart ends and said solder and passing a plurality of short durations of current between said electrodes, thereby effectively joining said ends, and (G) permitting the positions of said tapes to rotate slowly so as to reduce said angle during said butt splicing.

3. The method of claim 1 comprising the step of moderately braking rotation of said second of said tapes.

4. The method of claim 2 wherein said solder mostly comprises silver.

5. The method of claim 1 wherein said solder mostly comprises silver.

6. An apparatus for butt-splicing ends of copper-based tapes, comprising means for adjustably supporting said ends at a horizontal angle that varies during said splicing.

7. The apparatus of claim 6 wherein said supporting means comprise platforms hinged to rods having a common axis and comprising means for forming a slight angle in said axis.

8. The apparatus of claim 6 comprising means for electrically fusing solder to connect said ends between one flat and one rolling electrode.

9. The apparatus of claim 8 wherein said rolling electrode comprises a minor segment of a circle.

* * * * *